United States Patent
Hatta et al.

(10) Patent No.: US 9,393,742 B2
(45) Date of Patent: Jul. 19, 2016

(54) FIBER HOLDING DEVICE, HIGH PRESSURE GAS TANK MANUFACTURING APPARATUS AND MANUFACTURING METHOD OF TANK

(71) Applicant: TOYOTA JIDOSHA KABUSHIKI KAISHA, Toyota-shi, Aichi-ken (JP)

(72) Inventors: Ken Hatta, Okazaki (JP); Daigoro Nakamura, Kyoto (JP); Motohiro Tanigawa, Kyoto (JP); Tadashi Uozumi, Kyoto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/432,314

(22) PCT Filed: Sep. 30, 2013

(86) PCT No.: PCT/JP2013/005810
§ 371 (c)(1),
(2) Date: Mar. 30, 2015

(87) PCT Pub. No.: WO2014/054266
PCT Pub. Date: Apr. 10, 2014

(65) Prior Publication Data
US 2015/0224720 A1 Aug. 13, 2015

(30) Foreign Application Priority Data
Oct. 1, 2012 (JP) .................. 2012-219176

(51) Int. Cl.
| | | |
|---|---|---|
| B29C 70/16 | (2006.01) | |
| B65H 59/12 | (2006.01) | |
| B29C 70/32 | (2006.01) | |
| B65H 59/06 | (2006.01) | |
| F17C 1/06 | (2006.01) | |
| B29L 31/00 | (2006.01) | |
| B29C 53/58 | (2006.01) | |

(52) U.S. Cl.
CPC .............. B29C 70/16 (2013.01); B29C 70/32 (2013.01); B65H 59/06 (2013.01); B65H 59/12 (2013.01); F17C 1/06 (2013.01); *B29C 53/58* (2013.01); *B29L 2031/712* (2013.01); *B29L 2031/7172* (2013.01); *B65H 2701/314* (2013.01); *B65H 2701/38* (2013.01); *Y02E 60/321* (2013.01)

(58) Field of Classification Search
CPC ............. B65H 59/12; B65H 2701/314; B65H 2701/38; B65H 59/06; Y02E 60/321; B29C 70/32; B29C 53/58; B29C 70/16; F17C 1/06; B29L 2031/712; B29L 2031/7172
See application file for complete search history.

(56) References Cited

FOREIGN PATENT DOCUMENTS

| JP | S55-63345 U | 4/1980 |
|---|---|---|
| JP | S63-296925 A | 12/1988 |
| JP | 2005-262504 A | 9/2005 |
| JP | 2011-245780 A | 12/2011 |

OTHER PUBLICATIONS

Human translation of JP 55-063345.*

* cited by examiner

*Primary Examiner* — Jacob T Minskey
*Assistant Examiner* — Vishal I Patel
(74) *Attorney, Agent, or Firm* — Kenyon & Kenyon LLP

(57) ABSTRACT

There is provided a fiber holding device, comprising: a bobbin supported to be rotatable about an axis and configured to hold a fiber wound thereon; a release member configured to apply a force to the fiber drawn from the bobbin in a direction from the axis of the bobbin toward outer periphery; a tension applying member configured to apply tension to the fiber drawn from the bobbin; and an extended section extended from the bobbin and arranged to integrally hold the release member and the tension applying member in a sequence of the release member and the tension applying member toward downstream in a drawing direction of the fiber.

12 Claims, 7 Drawing Sheets

FIBER HOLDING DEVICE, HIGH PRESSURE GAS TANK MANUFACTURING APPARATUS AND MANUFACTURING METHOD OF TANK

CROSS-REFERENCE TO RELATED APPLICATIONS

This is a national phase application based on the PCT International Patent Application No. PCT/JP2013/005810 filed Sep. 30, 2013, claiming priority to Japanese Patent Application No. 2012-219176 filed Oct. 1, 2012, the entire contents of both of which are incorporated herein by reference.

TECHNICAL FIELD

The present invention relates to a technique of drawing a fiber flux held on a bobbin.

BACKGROUND ART

A high pressure gas tank is manufactured by winding carbon fiber, which is a bundle of several thousand fiber fluxes made of very thin filaments (for example, filaments having the fiber diameter of about 1 to 5 µm), on a resin liner (JP S63-296925A). The fiber fluxes of the carbon fiber have strong force sticking to each other, so that the fiber drawn from the bobbin may be twisted or damaged. In order to suppress or correct such twisting or damage of the fiber, for example, in a filament winding system described in JP 2011-245780A, a tension control mechanism is provided to control the tension of the fiber in the conveyance path of the fiber. A filament winding apparatus described in JP 2005-262504A has a guide mechanism placed in the vicinity of a bobbin to guide the fiber drawn from the bobbin.

SUMMARY

Technical Problem

The above prior art techniques have the separate mechanism configured to suppress twisting or damage of the fiber in the course of conveyance of the fiber drawn from the bobbin.

There is a need to provide a technique that suppresses twisting or damage of the fiber drawn from the bobbin without requiring any separate mechanism.

Solution to Problem

In order to solve at least part of the problems described above, the invention may be implemented by the following aspects.

(1) According to one aspect, there is provided a fiber holding device. The fiber holding device comprises: a bobbin supported to be rotatable about an axis and configured to hold a fiber wound thereon; a release member configured to apply a force to the fiber drawn from the bobbin in a direction from the axis of the bobbin toward outer periphery; a tension applying member configured to apply tension to the fiber drawn from the bobbin; and an extended section extended from the bobbin and arranged to integrally hold the release member and the tension applying member in a sequence of the release member and the tension applying member toward downstream in a drawing direction of the fiber.

In the fiber holding device of this aspect, the release member configured to apply the force to the drawn fiber in the direction from the axis of the bobbin toward the outer periphery and the tension applying member configured to apply the tension to the drawn fiber are integrally held by the extended section extended from the bobbin. The fiber holding device provided can thus suppress the fiber drawn from the bobbin from being twisted or damaged without requiring any separate mechanism. Compared with the prior art device that employs a separate mechanism to suppress and correct twisting or damage of the fiber, the fiber holding device of this aspect is space-saving.

(2) In the fiber holding device of the above aspect, the extended section may be extended in the direction from the axis of the bobbin toward the outer periphery.

In the fiber holding device of this aspect, the extended section is extended in the direction from the axis of the bobbin toward the outer periphery, so that the release member and the tension applying member may be located on an identical member.

(3) In the fiber holding device of the above aspect, the release member and the tension applying member may be arranged to be approximately parallel to the axis of the bobbin, and the tension applying member may have a length L2 in an axial direction longer than a length L1 of the axis.

In the fiber holding device of this aspect, the release member and the tension applying member are arranged to be approximately parallel to the axis of the bobbin. This arrangement enables the force to be evenly applied to the fiber drawn from the bobbin. The length of the tension applying member is longer than the length of the axis of the bobbin. This configuration enables the tension to be applied to the drawn fiber, irrespective of the winding position of the fiber wound on the bobbin.

(4) The fiber holding device of the above aspect may further comprise an assist member configured to assist drawing of the fiber from the bobbin when the extended section is rotated to a predetermined position.

In the fiber holding device of this aspect, when the tension applying member receives the tension of the drawn fiber due to, for example, adhesion of the fiber wound on the bobbin and the extended section configured to hold the tension applying member is rotated to the predetermined position, the assist member assists drawing of the fiber from the bobbin. The assist member is actuated only in the case that the extended section is rotated to the predetermined position. This reduces the energy required to actuate the assist member.

(5) In the fiber holding device of the above aspect, the release member may be configured to eject a gas toward the bobbin, so as to serve as the assist member.

In the fiber holding device of this aspect, the release member ejects the gas toward the bobbin. This facilitates separation of the fiber wound on the bobbin. The release member accordingly serves as the assist member to assist drawing of the fiber from the bobbin.

(6) In the fiber holding device of the above aspect, the release member may be made of a porous metal to be formed hollow and may be configured to eject the gas through pores of the porous metal in all directions toward outside of the release member, so as to serve as the assist member.

In the fiber holding device of this aspect, the release member ejects the gas through the pores of the porous metal in all directions toward outside of the release member. This facilitates separation of the fiber wound on the bobbin. The release member accordingly serves as the assist member to assist drawing of the fiber from the bobbin.

(7) In the fiber holding device of the above aspect, the release member may be vibrated, so as to serve as the assist member.

In the fiber holding device of this aspect, the release member is vibrated. This facilitates separation of the fiber wound on the bobbin. The release member accordingly serves as the assist member to assist drawing of the fiber from the bobbin.

(8) In the fiber holding device of the above aspect, the release member and the tension applying member may be formed in rod-like shape to be extended approximately parallel to the axis, and the extended section may be provided to be extended from one end face of the bobbin such as to hold one end of the release member and one end of the tension applying member.

In the fiber holding device of this aspect, the extended section holds respective one ends of the release member and the tension applying member extended approximately parallel to the axis of the bobbin. In other words, the respective other ends of the release member and the tension applying member are free ends. This configuration improves the workability in winding the fiber on the bobbin.

(9) In the fiber holding device of the above aspect, the release member and the tension applying member may be formed in rod-like shape to be extended approximately parallel to the axis, and the extended sections may be provided to be extended from both end faces of the bobbin, such that one extended section is arranged to hold one end of the release member and one end of the tension applying member and the other extended section is arranged to hole the other end of the release member and the other end of the tension applying member.

In the fiber holding device of this aspect, the extended section holds both ends of both the release member and the tension applying member extended approximately parallel to the axis of the bobbin. The extended section can thus hold the release member and the tension applying member in a stable state.

(10) According to another aspect, there is a tank manufacturing apparatus comprising: the fiber holding device according to any one of the above aspect.

The tank manufacturing apparatus suppresses the fiber drawn from the bobbin from being twisted or damaged. This accordingly improves the quality of a tank manufactured.

(11) According to another aspect, there is provided a manufacturing method of a tank. The manufacturing method of the tank comprises: providing a liner in an approximately cylindrical shape; winding a fiber on the liner, the fiber being impregnated with a thermosetting resin, being wound on a bobbin supported to be rotatable about an axis and being fed from the bobbin, in which a release member configured to apply a force to the fiber drawn from the bobbin in a direction from the axis of the bobbin toward outer periphery and a tension applying member configured to apply tension to the fiber drawn from the bobbin are integrally held in a sequence of the release member and the tension applying member toward downstream in a drawing direction of the fiber; and heating the thermosetting resin included in the fiber to cure the thermosetting resin.

The manufacturing method of the tank of this aspect winds the fiber fed from the bobbin on the liner. In the bobbin, the release member configured to apply the force to the drawn fiber in the direction from the axis of the bobbin toward the outer periphery and the tension applying member configured to apply the tension to the drawn fiber are integrally held. The fiber holding device which is space-saving and allows for suppression and correction of twisting or damage of the fiber can accordingly be used to manufacture tanks. This improves the productivity in manufacturing tanks.

The invention may be implemented by any of various aspects other than the above device: for example, a system achieving the functions of the fiber holding device, a control method of the fiber holding device, a computer program implementing such a control method and a non-transitory storage medium in which such a computer program is recorded.

DESCRIPTION OF EMBODIMENTS

A. First Embodiment

A-1. Configuration of High Pressure Gas Tank Manufacturing Apparatus

Figure 1:
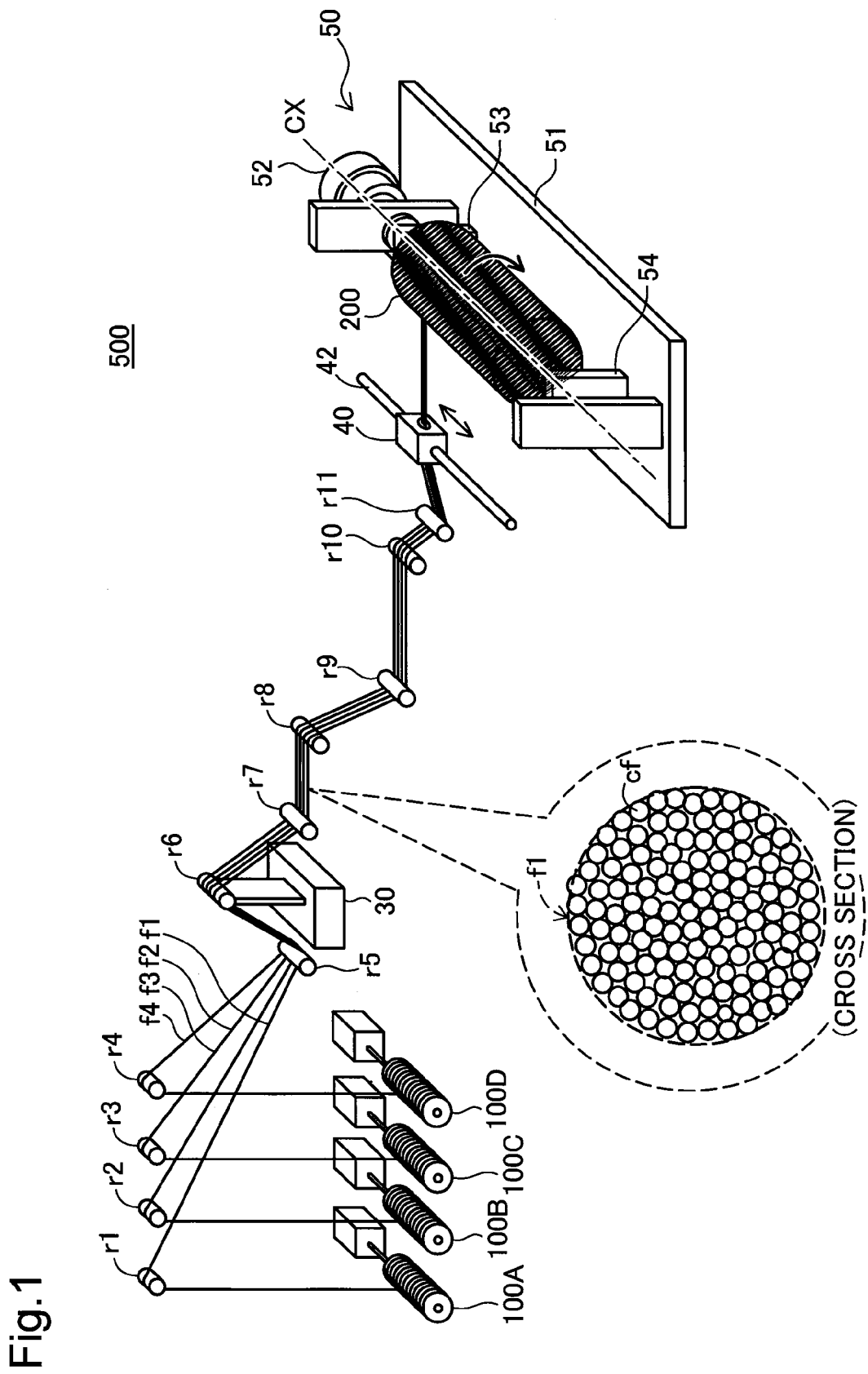
FIG. 1 is a diagram conceptually illustrating the configuration of a high pressure gas tank manufacturing apparatus according to one embodiment of the invention.

FIG. 1 is a diagram conceptually illustrating the configuration of a high pressure gas tank manufacturing apparatus according to one embodiment of the invention. The high pressure gas tank manufacturing apparatus 500 winds up carbon fibers on a resin liner in an approximately cylindrical shape by filament winding (FW) method to manufacture a high pressure gas tank. The high pressure gas tank manufactured may be used, for example, as a storage tank of hydrogen gas which is fuel gas in a fuel cell vehicle.

The high pressure gas tank manufacturing apparatus 500 includes four bobbin devices 100A to 100D, eleven guide rollers r1 to r11, a tension regulator 30, a fiber drawer 40, a guide shaft 42 and a fiber winding unit 50.

The four bobbin devices 100A to 100D respectively have identical carbon fibers wound thereon in advance. The carbon fiber is formed by bundling a large number of (for example, twenty thousand) filaments cf of about 1 μm in fiber diameter and is prepreg impregnated in advance with an epoxy resin which is a thermosetting resin. Available examples of such carbon fiber include rayon-based carbon fibers, polyacrylonitrile (PAN)-based carbon fibers and pitch-based carbon fibers. The carbon fiber flux has an approximately circular cross section. For convenience of explanation, in the following description, the carbon fibers wound on the four bobbin devices 100A to 100D are respectively called carbon fiber fluxes f1 to f4.

The bobbin devices 100A to 100D are respectively linked to the fiber drawer 40 to draw the carbon fiber fluxes f1 to f4 according to the amounts of the carbon fiber fluxes f1 to f4 wound on a resin liner 200. In the description below, the bobbin devices 100A to 100D are simply called "bobbin device 100" when no discrimination is needed in explanation. The bobbin device 100 serves as the "fiber holding device".

The eleven guide rollers r1 to r11 are respectively arranged to be freely rotatable and convey the carbon fiber fluxes f1 to f4 drawn from the four bobbin devices 100A to 100D to the fiber drawer 40. The eight guide rollers r1 to r8 apply the tension to the carbon fiber fluxes f1 to f4 during conveyance. For example, members formed in a cylindrical shape from a resin or a metal may be employed for such guide rollers r1 to r8. The tension regulator 30 is connected with the guide roller r6 to display the guide roller r6 and thereby regulate the tensions of the carbon fiber fluxes f1 to f4 during conveyance.

The fiber drawer 40 draws the carbon fiber fluxes f1 to f4 conveyed from the guide roller r11 to be wound on the resin liner 200 located on the fiber winding unit 50. The fiber drawer 40 moves back and forth along the guide shaft 42 to wind the carbon fiber fluxes f1 to f4 on the front surface of the resin liner 200. The guide shaft 42 is arranged parallel to an axis CX of the resin liner 200. For example, hoop winding or helical winding may be employed as the winding technique of the carbon fiber fluxes f1 to f4.

The fiber winding unit 50 includes a base 51, a pair of support plates 53 and 54 and a rotation actuator 52. The pair of support plates 53 and 54 are arranged across a predetermined interval on the base 51 to support the resin liner 200 in a freely rotatable manner. The rotation actuator 52 is placed outside of the support plate 53 to rotate the resin liner 200 about the axis CX of the resin liner 200 as the center axis. The resin liner 200 is made of nylon resin and has a hollow structure.

A-2. Structure of Fiber Holding Device

Figure 2:
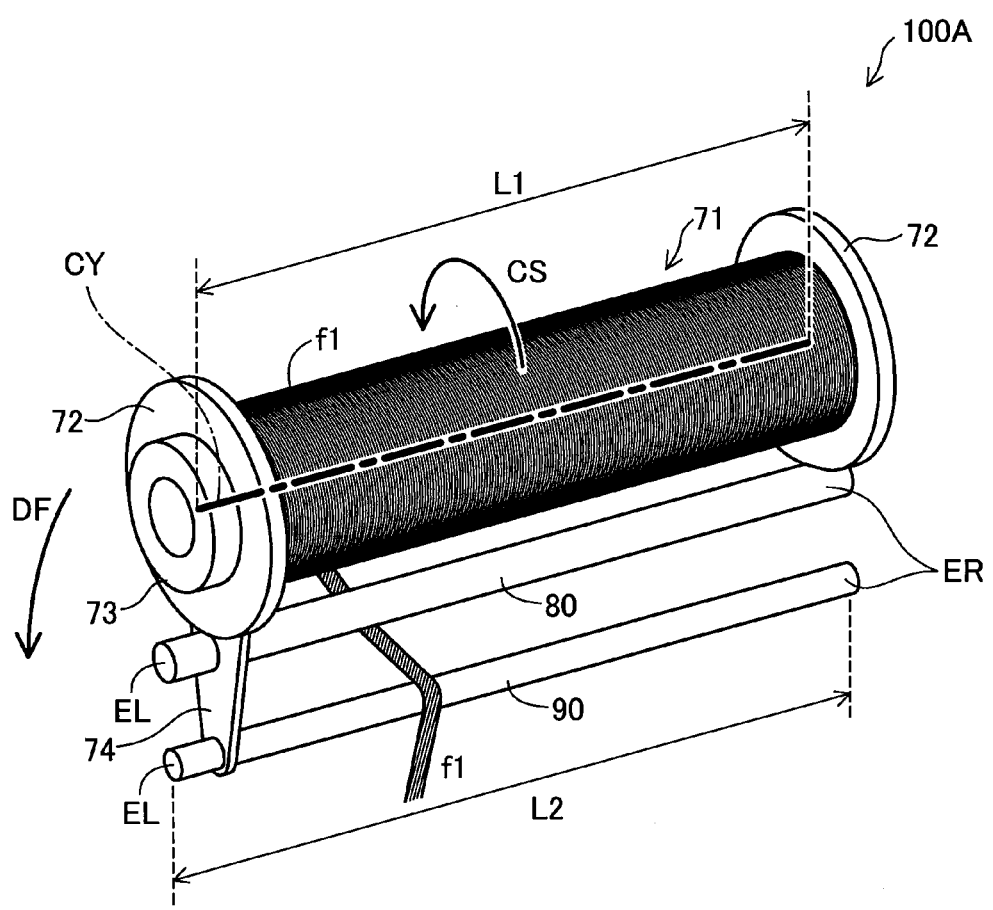
FIG. 2 is a perspective view illustrating the structure of a bobbin device.

FIG. 2 is a perspective view illustrating the structure of a bobbin device. The following describes the bobbin device 100A as an example. The bobbin devices 100B to 100D have the same structure.

The bobbin device 100A holds the carbon fiber flux f1 in the wound state. The bobbin device 100A includes a main unit 71, two circular plates 72, a bobbin actuator 73, an extended section 74, a release bar 80 and a slack control bar 90. The main unit 71 and the two circular plates 72 may be collectively called "bobbin".

The main unit 71 is a member provided to hold the carbon fiber flux f1 in the wound state. The main unit 71 of this embodiment is in a cylindrical shape and is made of, for example, a resin or a metal. The circular plates 72 are members placed on both end faces of the main unit 71. The circular plates 72 are in the form of approximately circular plates and are made of, for example, a resin or a metal. The bobbin actuator 73 is connected with the main unit 71. The bobbin actuator 73 receives the driving force of an internal motor to rotate the main unit 71 in a counterclockwise direction CS about an axis CY of the main unit 71 and thereby draw the carbon fiber flux f1 from the main unit 71. The bobbin actuator 73 is configured to transmit the driving force to only the main unit 71 and not to rotate the circular plates 72.

The extended section 74 is a member provided to hold the release bar 80 and the slack control bar 90 integrally in the sequence of the release bar 80 and the slack control bar 90 toward the downstream of a drawing direction DF of the carbon fiber flux f1. The extended section 74 is a member provided to be extended from one of the circular plates 72 and is in the form of a chamfered isosceles triangular plate. Part of the extended section 74 corresponding to the base of the isosceles triangle is joined with an arc of the circular plate 72. Part of the extended section 74 corresponding to the two equal sides of the isosceles triangle is extended in a direction from the axis CY of the bobbin toward the outer periphery (in other words, in a direction from the axis CY of the main unit 71 toward the outer periphery). The extended section 74 is made of, for example, a resin or a metal. According to this embodiment, as shown in FIG. 2, both the release bar 80 and the slack control bar 90 are held by the single extended section 74. Accordingly, the release bar 80 and the slack control bar 90 respectively have one fixed ends EL and the other non-fixed ends ER. This arrangement improves the workability during winding a carbon fiber flux on the bobbin unit 100A. Alternatively employable is a configuration having two extended sections 74 extended respectively from the two circular plates 72, in other words, a configuration where both the ends EL and the ends ER of the release bar 80 and the slack control bar 90 are held by the extended sections 74. This arrangement enables the respective ends of both the release bar 80 and the slack control bar 90 to be held stably by the extended sections 74.

Figure 3:
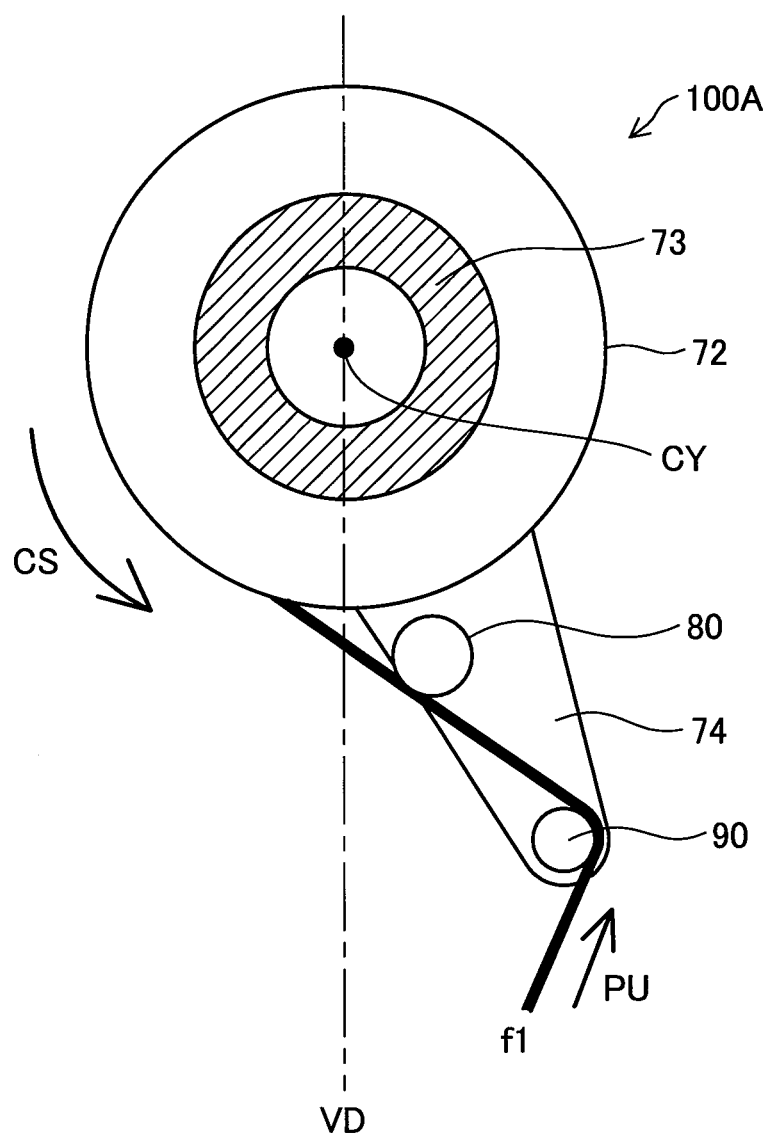
FIG. 3 is a side view illustrating the structure of the bobbin device.

FIG. 3 is a side view illustrating the structure of the bobbin device. The release bar 80 is in a rod-like shape (long cylindrical shape) and is joined with the extended section 74 at the position in the vicinity of its bottom and on the side from which the carbon fiber flux f1 is drawn. The end EL of the release bar 80 is joined with the extended section 74 at the above position, so that the release bar 80 is held in the state approximately parallel to the axis CY of the main unit 71 (FIG. 2). The release bar 80 is made of, for example, a resin or a metal.

The slack control bar 90 is in a rod-like shape (long cylindrical shape) and is joined with the extended section 74 at the position in the vicinity of its apex angle. The end EL of the slack control bar 90 is joined with the extended section 74 at the above position, so that the slack control bar 90 is held in the state approximately parallel to the axis CY of the main unit 71 (FIG. 2). It is also preferable that a length L2 of the slack control bar 71 in the longitudinal direction (direction of the axis CY of the main unit 71) is longer than a length L1 of the axis CY of the main unit 71. The slack control bar 90 is made of, for example, a resin or a metal.

Outside of the carbon fiber flux f1 in the state wound on the main unit 71 (side exposed to the outside air) is called "fiber outside". Inside of the carbon fiber flux f1 in the state wound on the main unit 71 (side in contact with the lower layer of the carbon fiber flux f1) is called "fiber inside". The fiber inside of the carbon fiber flux f1 drawn from the main unit 71 comes into contact with the release bar 80. The fiber outside of the carbon fiber flux f1 drawn from the main unit 71 comes into contact with the slack control bar 90. In other words, the release bar 80 and the slack control bar 90 hold the fiber alternately.

The circular plate 72 is fixed to the support shaft for supporting the bobbin device 100A via an elastic member such as a coil spring. This spring causes the spring force in the counterclockwise direction CS about the axis CY of the main unit 71 to be continuously applied to the circular plate 72 and the extended section 74. The extended section 74 is accordingly kept inclined in the rotating direction by the spring force (i.e., the counterclockwise direction CS) relative to a vertical direction VD. The slack control bar 90 joined with the extended section 74 at the position in the vicinity of its apex angle accordingly pulls the carbon fiber flux f1 which is drawn from the main unit 71 and is located downstream of the slack control bar 90 in the drawing direction, in a direction PU opposite to the drawing direction of the carbon fiber flux f1. As a result, the slack control bar 90 applies tension to the drawn carbon fiber flux f1. The strength of the tension applied to the carbon fiber flux f1 by the slack control bar 90 is arbitrarily adjustable by the spring.

Figure 4:
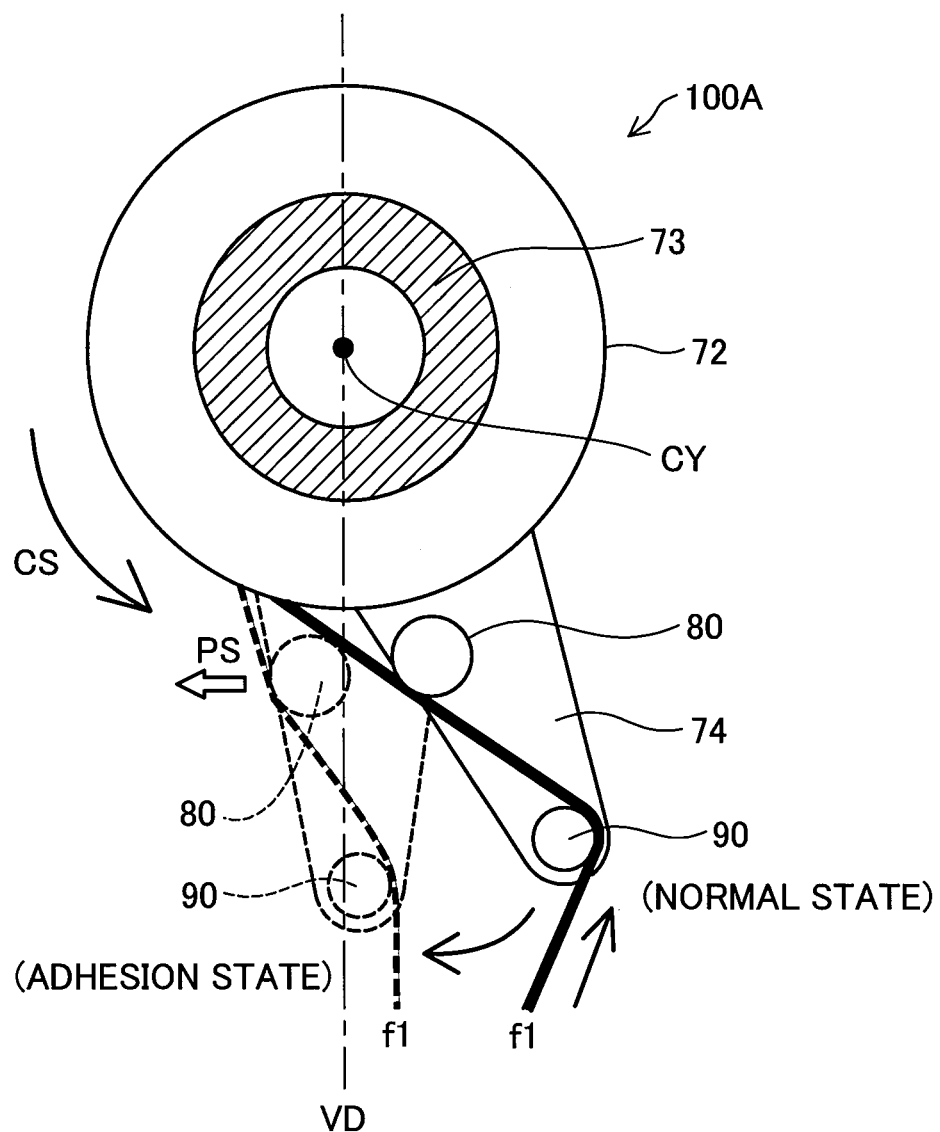
FIG. 4 is a diagram illustrating the functions of a release bar.

FIG. 4 is a diagram illustrating the function of the release bar 80. Like FIG. 3, FIG. 4 illustrates the side view of the bobbin device 100.

The illustration by the solid line in FIG. 4 is the side view in the state that the carbon fiber flux f1 is smoothly drawn from the main unit 71 without making filaments cf of the wound carbon fiber flux f1 stick to each other. In the description below, sticking of the filaments cf of the carbon fiber flux f1 is expressed as "adhesion of the carbon fiber flux f1". When the carbon fiber flux f1 is in the non-adhesion state, the release bar 80 only comes into contact with the carbon fiber flux f1 drawn from the main unit 71. The slack control bar 90 applies tension to the drawn carbon fiber flux f1. The details have been described above with reference to FIG. 3.

The illustration by the broken line in FIG. 4 is the side view in the state that the filaments cf of the wound carbon fiber flux f1 sticking to each other interferes with smoothly drawing the carbon fiber flux f1 from the main unit 71. When the carbon fiber flux f1 is in the adhesion state and is not smoothly drawn, part of the spring force in the counterclockwise direction CS about the axis CY is cancelled out by the sticking force (adhesion force) of the filaments cf. In this state, the carbon fiber flux f1 is not newly drawn from the main unit 71, so that the slack control bar 90 is pressed by the adhered portion of the carbon fiber flux f1 and the tension of the carbon fiber flux f1 drawn to the fiber drawer 40. As a result, the extended section 74 becomes approximately parallel to the vertical direction VD.

The release bar 80 located at the position in the vicinity of the bottom of the extended section 74 and on the side from which the carbon fiber flux f1 is drawn then works to push the drawn carbon fiber flux f1 toward an outer side PS which is the direction from the axis CY of the bobbin toward the outer periphery (in other words, direction from the axis CY of the main unit 71 toward the outer periphery). In the state that the extended section 74 becomes approximately parallel to the vertical direction VD, the release bar 80 applies the force to the vicinity of the base of the drawn carbon fiber flux f1 toward the outer side PS which is the direction from the axis CY of the bobbin toward the outer periphery (in other words, direction from the axis CY of the main unit 71 toward the outer periphery). The release bar 80 is thus likely to break up the adhering carbon fiber flux f1.

The release bar serves as the "release member", and the slack control bar serves as the "tension applying member".

As described above, the bobbin device 100A (fiber holding device) of the first embodiment has the release bar 80 (release member) configured to apply the force to the drawn carbon fiber flux f1 (fiber) in the direction from the axis CY of the bobbin toward the outer periphery, and the slack control bar 90 (tension applying member) configured to apply the tension to the drawn carbon fiber flux f1. The release bar 80 and the slack control bar 90 are held integrally toward the downstream of the drawing direction DF of the carbon fiber flux f1 (FIG. 2) by the extended section 74 extended from the circular plate 72 of the bobbin. The bobbin device 100A provided can thus suppress the carbon fiber flux f1 drawn from the main unit 71 from being twisted or damaged without requiring any separate mechanism. Compared with the prior art device that employs a separate mechanism to suppress and correct twisting or damage of a carbon fiber flux, the bobbin device 100A provided is space-saving.

Additionally, the bobbin device 100A (fiber holding device) of the first embodiment synchronizes the two bars having different functions, i.e., the release bar 80 (applying the force of separating the carbon fiber flux f1 from the main unit 71) and the slack control bar 90 (applying the tension to the drawn carbon fiber flux f1), while enabling both the functions to be achieved simultaneously. This configuration can thus suppress a potential slack of the carbon fiber flux f1 and a potential failure of separation of the carbon fiber flux f1 simultaneously.

Furthermore, in the bobbin device 100A (fiber holding device) of the first embodiment, the release bar 80 (release member) and the slack control bar 90 (tension applying member) are formed in the rod-like shape arranged to be approximately parallel to the axis CY of the bobbin (FIG. 2). This arrangement enables the force to be evenly applied to the carbon fiber flux f1 (flux) drawn from the main unit 71. In other words, this arrangement enables the force to be evenly applied to the drawn carbon fiber flux f1, irrespective of the winding position of the carbon fiber flux f1 wound on the main unit 71. The length L2 of the slack control bar 90 is longer than the length L1 of the axis CY of the bobbin (L2>L1, FIG. 2). This configuration enables the tension to be applied to the drawn carbon fiber flux f1, irrespective of the winding position of the carbon fiber flux f1 wound on the main unit 71.

Moreover, the high pressure gas tank manufacturing apparatus 500 of the first embodiment described above feeds the carbon fiber flux f1 along the stable trajectory, while suppressing the carbon fiber flux f1 (fiber) drawn from the main unit 71 from being twisted or damaged. This stabilizes the strength and the dimensions of a high pressure gas tank manufactured by the high pressure gas tank manufacturing apparatus 500 and improves the quality of the manufactured high pressure gas tank. In the individual bobbin devices 100A (fiber holding device), the release bar 80 (release member) and the slack control bar 90 (tension applying member) are held integrally by the extended section 74 extended from the bobbin. This configuration allows for downsizing of the high pressure gas tank manufacturing apparatus having fibers fed from the plurality of bobbin devices 100A.

B. Second Embodiment

A second embodiment of the invention describes the configuration of further accelerating breaking-up of the adhering carbon fiber flux in the high pressure gas tank manufacturing apparatus of the first embodiment. The following describes only components having different structures and functions from those of the first embodiment. The like components to those of the first embodiment are expressed by the like symbols to those of the above first embodiment in the illustration and are not specifically described herein.

B-1. Configuration of High Pressure Gas Tank Manufacturing Apparatus

A high pressure gas tank manufacturing apparatus 500 of the second embodiment has the general configuration similar to that of the first embodiment shown in FIG. 1.

B-2. Structure of Fiber Holding Device

A bobbin device 100A of the second embodiment has substantially similar structure to that of the first embodiment shown in FIGS. 2 to 4. The bobbin device 100A of the second embodiment, however, has a bobbin actuator $73x$ and a release bar $80x$ respectively instead of the bobbin actuator 73 and the release bar 80. The release bar $80x$ has the function of assisting drawing of the carbon fiber flux f1 from the main unit 71.

Figure 5:
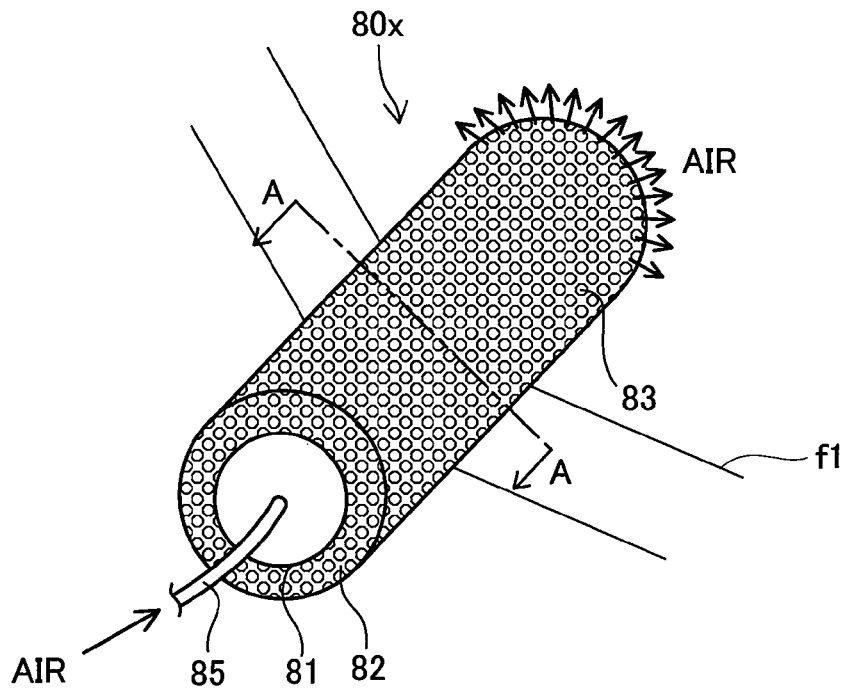
FIG. 5 is an enlarged view illustrating part of a release bar according to a second embodiment.

FIG. 5 is an enlarged view illustrating part of the release bar 80x according to the second embodiment. The release bar 80x is formed in a hollow cylindrical shape. The release bar 80x has an outer shell section 82 and a cover section 81. The outer shell section 82 is made of, for example, a porous metal and has a large number of micro pores 83. In order to suppress the pores 83 from being clogged by the resin which the carbon fiber flux f1 is impregnated with, the respective pores 83 preferably have a pore diameter of, for example, 500 μm or smaller. The cover section 81 is placed on an end face of the outer shell section 82. The cover section 81 is connected with piping 85 and feeds the air supplied via the piping 85 to an internal space of the outer shell section 82.

The bobbin actuator 73x of the second embodiment has a built-in air compressor. The air compressor is connected with the release bar 80x via the piping 85 to feed the air to inside of the release bar 80x. In this embodiment, the air fed by the air compressor is compressed to the pressure of 1 MPa or lower and has ordinary temperature (about 25° C.).

Figure 6:
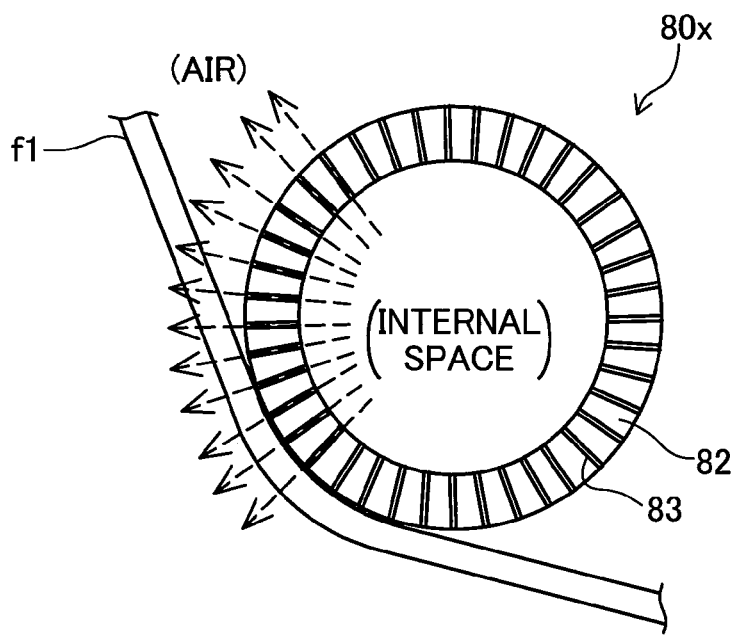
FIG. 6 is a diagram schematically illustrating an A-A cross section in FIG. 5.

FIG. 6 is a diagram schematically illustrating an A-A cross section in FIG. 5. The pores 83 provided in the outer shell section 82 are extended along the thickness direction of the outer shell section 82 to make the internal space of the release bar 80x communicate with the outer surface of the outer shell section 82. Accordingly the air fed into the internal space of the release bar 80x is blown from the internal space of the release bar 80x in all directions toward the outer surface of the outer shell section 82. In the air ejected in all directions toward outside of the outer shell section 82, the air ejected in the directions of the drawn carbon fiber flux f1 suppresses the filaments cf from sticking to the outer surface of the outer shell section 82. In the air ejected in all directions toward outside of the outer shell section 82, the air ejected in the directions of the main unit 72 of the bobbin suppresses the filaments cf of the carbon fiber flux f1 from sticking to each other (adhesion of the carbon fiber flux f1).

The air feeding by the air compressor may be performed continuously or may be performed by some trigger. For example, the air may be fed only on the occurrence of adhesion of the carbon fiber flux f1. "On the occurrence of adhesion of the carbon fiber flux f1" means the state that the slack control bar 90 is pressed by the adhered portion of the carbon fiber flux f1 and the tension of the carbon fiber flux f1 drawn to the fiber drawer 40 and the extended section 74 is rotated to a predetermined position. For example, a limit switch may be provided between the bobbin actuator 73x and the circular plate 72 to detect adhesion of the carbon fiber flux f1 and trigger actuation of the air compressor. The configuration of actuating the air compressor and enabling the function of the release bar 80x as the assist member only in the case of rotation of the extended section 74 to the predetermined position reduces the required energy.

The release bar 80x of the second embodiment serves as the "assist member".

As described above, the bobbin device 100A (fiber holding device) of the second embodiment has the similar advantageous effects to those of the bobbin device 100A of the first embodiment. Additionally, in the bobbin device 100A of the second embodiment, the release bar 80x serves as the assist member to assist drawing of the carbon fiber flux f1 (fiber) from the bobbin.

More specifically, the release bar 80x (release member) is made of the porous metal to be formed hollow and ejects the gas in all directions toward the outside of the release bar 80x. This facilitates separation of the carbon fiber flux f1 (fiber) wound on the main unit 71. As a result, the release bar 80x serves as the assist member to assist drawing of the fiber from the bobbin.

D. Third Embodiment

A third embodiment of the invention describes a manufacturing method of a tank using the high pressure gas tank manufacturing apparatus described in the above embodiment. The following describes only components having different structures and functions from those of the first embodiment.

Figure 8:
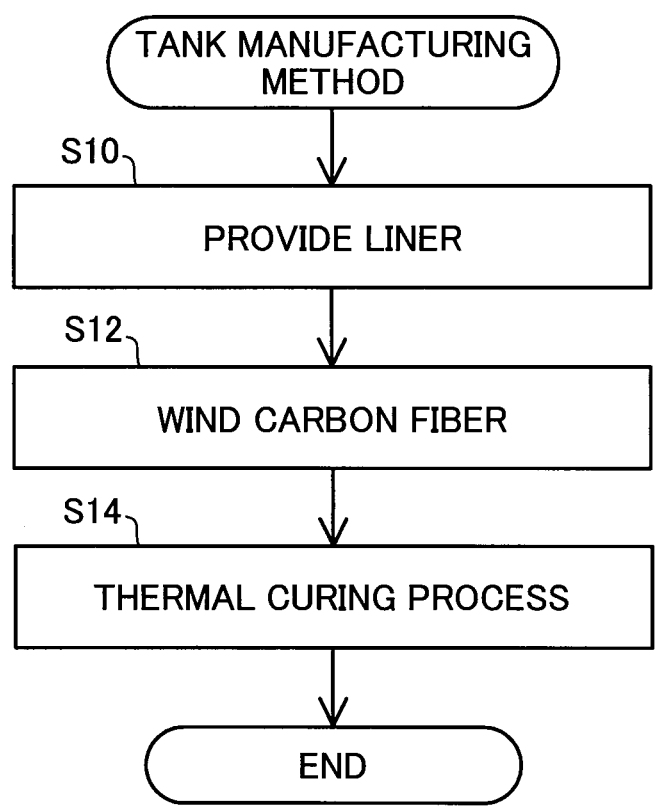
FIG. 8 is a flowchart showing a procedure of manufacturing method of a tank.

FIG. 8 is a flowchart showing a procedure of the manufacturing method of the tank. At step S10, the procedure provides the resin liner 200 in the approximately cylindrical shape and sets the resin liner 200 in the high pressure gas tank manufacturing apparatus 500 (FIG. 1).

At step S12, the procedure winds the carbon fiber flux f1 on the resin liner 200. This carbon fiber flux f1 is wound on the bobbin (main unit 71 and two circular plates 72, FIG. 2) supported to be rotatable about the axis CY and is fed from the bobbin to the resin liner 200. The extended section 74 provided on the circular plate 72 of the bobbin integrally holds the release member (release bar 80) configured to apply the force to the carbon fiber flux f1 drawn from the bobbin in the direction from the axis CY of the main unit 71 of the bobbin toward the outer periphery and the tension applying member (slack control bar 90) configured to apply the tension to the carbon fiber flux f1 drawn from the bobbin, in the sequence of the release member and the tension applying member toward the downstream in the drawing direction of the carbon fiber flux f1 (FIG. 3). The technique employed to wind the fiber on the resin liner 200 at step S12 may be, for example, hoop winding or helical winding.

At step S14, the procedure heats the resin liner 200 after completion of winding of the carbon fiber in a heating furnace to cure the thermosetting resin included in the carbon fiber.

The tank is manufactured by the foregoing procedure. The manufacturing method of the tank described in the third embodiment causes the fiber (carbon fiber flux f1) fed from the bobbin, in which the release member (release bar 80) configured to apply the force to the drawn fiber (carbon fiber flux f1) in the direction from the axis CY of the main unit 71 of the bobbin toward the outer periphery and the tension applying member (slack control bar 90) configured to apply the tension to the drawn fiber (carbon fiber flux f1) are held integrally, to be wound on the resin liner 200. The fiber holding device (bobbin device 100) which is space-saving and allows for suppression and correction of twisting or damage of the fiber can accordingly be used to manufacture tanks. This improves the productivity in manufacturing tanks.

C. Modifications

Among the components of each of the embodiments described above, any of the components other than those described in independent claims are additional components and may be omitted appropriately. The invention is not limited to the embodiments described above but may be implemented by a diversity of other aspects without departing from the scope of the invention. Some examples of possible modification are given below.

Modification 1

The above embodiments describe exemplary structures of the bobbin device. The structure of the bobbin device may, however, be modified in any of various ways without departing from the scope of the invention. Some examples of such modifications include omission of part of the components, addition of new components and replacement of the components.

For example, the bobbin of the above embodiment has the circular plates located on both end faces of the cylindrical main unit. This structure of the bobbin is only illustrative and may be modified in any of various ways. For example, the bobbin may be formed by only the cylindrical member with omission of the circular plates. In another example, the cylindrical shape may be replaced by a hollow polygonal column shape. In yet another example, two circular plates may be used to fix the respective ends of a plurality of rod-like members in a circular form or in a polygonal form.

In another example, the extended section is provided to be extended from the circular plate in the above embodiment. In the modified structure without circular plates, for example, the extended section may be provided to be extended from an end face of the main unit. In this modification, the bobbin actuator may be configured to transmit the driving force to only the main unit while not rotating the extended section.

Figure 7:
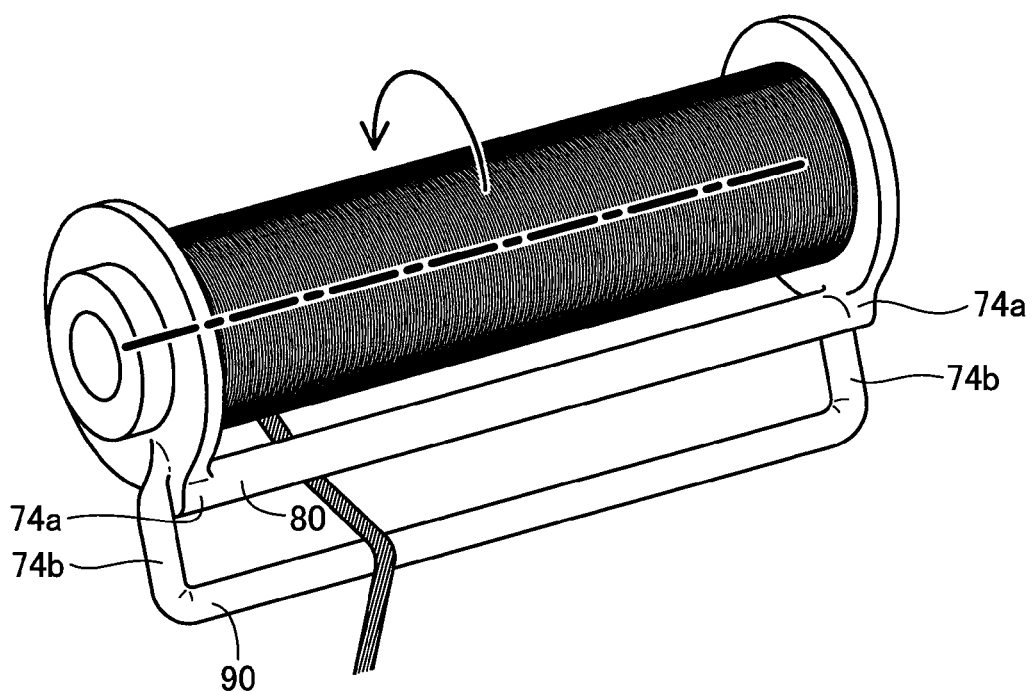
FIG. 7 is a diagram illustrating the structure of an extended section according to one modification.

In another example, the extended section is provided as a member in the chamfered isosceles triangular shape in the above embodiment. The extended section may, however, be in any of other adequate shapes that allow the release bar and the slack control bar to be held integrally. For example, the extended section may be comprised of a plurality of members. FIG. 7 is a diagram illustrating the structure of an extended section according to one modification. As shown in FIG. 7, an extended section 74a for supporting the release bar 80 and an extended section 74b for supporting the slack control bar 90 may be extended separately from the bobbin, and the release bar 80 and the slack control bar 90 may be held integrally by the extended sections 74a and 74b. In this modified structure, the extended sections 74a and 74b serve as the "extended section".

The shape of the extended section is not limited to the isosceles triangular shape but may be, for example, a rectangular shape or an elliptical shape.

Modification 2

The above second embodiment describes one exemplary configuration that causes the release bar to serve as the assist member. The configuration of the above second embodiment is, however, only illustrative and may be modified in any of various ways.

For example, the outer shell section of the release bar is made of the porous metal. The material of the outer shell section of the release bar may be, however, a thin metal plate (for example, stainless steel plate) or metal mesh with a large number of apertures, instead of the porous metal. In the modification having the outer shell section made from the thin metal plate with a large number of apertures, for example, the apertures may have a circular cross sectional shape. In another example, the apertures may have a rectangular cross sectional shape extended in the width direction of the outer shell section and may be arranged as slit-like apertures.

In the above embodiment, the outer shell section of the release bar is made of the porous metal. The outer shell section may, however, be formed from a thin metal plate (for example, stainless steel plate) instead of the porous metal and may have a slit formed at a desired position in the metal plate. The position of the slit in the outer shell section is preferably a position that allows the air to be ejected at least from the release bar toward the main unit. In this modified configuration, the release bar (release member) can eject the gas toward the bobbin. This facilitates separation of the carbon fiber flux f1 (fiber) wound on the main unit of the bobbin. The release bar accordingly serves as the assist member to assist drawing of the carbon fiber flux f1 from the main unit.

In the above embodiment, the release bar ejects the air in the direction of the bobbin or in the direction of the drawn carbon fiber flux f1 to serve as the assist member. The release bar may alternatively be configured to assist drawing of the carbon fiber flux f1 from the bobbin by a technique other than the air ejection. Specifically, the release bar may have a built-in ultrasonic transducer and may vibrate the release bar by a specified trigger (as described in detail in the above second embodiment). Such vibration of the release bar (release member) facilitates separation of the carbon fiber flux f1 (fiber) wound on the main unit of the bobbin. The release bar accordingly serves as the assist member to assist drawing of the carbon fiber flux f1 from the bobbin.

Modification 3

The above second embodiment describes one exemplary configuration that causes the release bar to serve as the assist member. The configuration of the above second embodiment is, however, only illustrative and may be modified in any of various ways.

The air fed by the air compressor has ordinary temperature (for example, 25° C.) in the above embodiment, but the higher-temperature air may be ejected. For example, a heating chamber having a heating wire placed therein is provided inside of the air compressor, and the air heated in this heating chamber may be fed to the inside of the release bar. In another example, the release bar may have a built-in heating wire, and the air may be heated inside of the release bar. In general, the thermosetting resin included in the carbon fiber fluxes f1 to f4 has the viscosity decreasing by heating. Ejection of the high-temperature air thus further improves the effects of suppressing the filaments cf from sticking to each other and suppressing the filaments cf from sticking to the surface of the release bar. The temperature of the heated air is preferably, for example, in the range of 130° C. to 180° C. This is because the thermosetting resin is likely to be softened in this range of 130° C. to 180° C. This range of 130° C. to 180° C. is, however, not restrictive, and the air may be heated to higher temperature.

In the above embodiment, the gas fed by the air compressor is the air. Any other suitable gas, for example, nitrogen gas may be used instead of the air.

Modification 4

In the above embodiment, the thermosetting resin included in the carbon fiber fluxes f1 to f4 is the epoxy resin. Any suitable resin other than the epoxy resin may, however, be employed: for example, phenolic resin, urea resin, melamine resin or unsaturated polyester resin. The carbon fiber fluxes f1 to f4 may be configured without inclusion of the thermosetting resin. In this modification, the fiber flux may be impregnated with a thermosetting resin in the course of the conveyance of the fiber flux. The carbon fiber may be replaced by any other suitable fiber, such as glass fiber or aramid fiber.

Modification 5

In the above embodiments, the bobbin device is provided as the functional component included in the high pressure gas tank manufacturing apparatus. The bobbin device may, however, be provided as a separate or independent device. In this modification, the bobbin device of the invention may be applied to any apparatus configured to wind fiber, other than the high pressure tank manufacturing apparatus. For example, the bobbin device of the invention may be applied to an apparatus configured to wind fiber on, for example, a propeller shaft or a door frame used in, for example, a vehicle or air craft.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 30 tension regulator
40 fiber drawer
42 guide shaft
40 fiber winder
51 base
52 rotation actuator
53 support plate
71 main unit
72 circular plate
73 bobbin actuator
73x bobbin actuator
74 extended section
74a extended section
74b extended section
80 release bar
80x release bar
81 cover section
82 outer shell section
83 pore
85 piping
90 slack control bar
100 bobbin device
100A-100D bobbin devices
200 resin liner
500 high pressure gas tank manufacturing apparatus
CX axis
CY axis
cf filament
f1-f4 carbon fiber fluxes
EL end
ER end

The invention claimed is:

1. A fiber holding device, comprising:
a bobbin supported to be rotatable about an axis and configured to have a main unit that holds a fiber wound thereon and a plate member that is rotatable independently of the main unit;
a release member configured to apply a force to the fiber drawn from the main unit in a direction from the axis of the bobbin toward outer periphery;
a tension applying member configured to apply tension to the fiber drawn from the main unit;
an extended section extended from the plate member and arranged to integrally hold the release member and the tension applying member in a sequence of the release member and the tension applying member toward downstream in a drawing direction of the fiber; and
wherein the extended section is rotatable in the opposite direction from a rotating direction of the main unit during drawing of the fiber from the main unit, together with rotation of the plate member.

2. The fiber holding device according to claim 1, wherein the extended section is extended in the direction from the axis of the bobbin toward the outer periphery.

3. The fiber holding device according to claim 1, wherein the release member and the tension applying member are arranged to be approximately parallel to the axis of the bobbin, and
the tension applying member has a length in an axial direction longer than a length of the axis.

4. The fiber holding device according to claim 1, further comprising:
an assist member configured to assist drawing of the fiber from the bobbin when the extended section is rotated to a predetermined position.

5. The fiber holding device according to claim 4, wherein the release member is configured to eject a gas toward the bobbin, so as to serve as the assist member.

6. The fiber holding device according to claim 4, wherein the release member is made of a porous metal to be formed hollow and is configured to eject the gas through pores of the porous metal in all directions toward outside of the release member, so as to serve as the assist member.

7. The fiber holding device according to claim 4, wherein the release member is vibrated, so as to serve as the assist member.

8. The fiber holding device according to claim 1, wherein the release member and the tension applying member are formed in rod-like shape to be extended approximately parallel to the axis, and
the extended section is provided to be extended from one plate member of the bobbin such as to hold one end of the release member and one end of the tension applying member.

9. The fiber holding device according to claim 1, wherein the release member and the tension applying member are formed in rod-like shape to be extended approximately parallel to the axis, and
the extended sections are provided to be extended from both plate members of the bobbin, such that one extended section is arranged to hold one end of the release member and one end of the tension applying member and the other extended section is arranged to hole the other end of the release member and the other end of the tension applying member.

10. A high pressure gas tank manufacturing apparatus, comprising:
the fiber holding device according to claim 1.

11. The fiber holding device according to claim 1, wherein
the release member increases the force applied to the fiber in the direction toward the outer periphery, associated with rotation of the extended section in a reverse direction to a rotating direction of the main unit during drawing of the fiber from the main unit.

12. The fiber holding device according to claim 1, wherein the extended section is pressed in a rotating direction of the main unit during drawing of the fiber from the main unit.

* * * * *